United States Patent [19]

Geyer

[11] Patent Number: 5,332,314
[45] Date of Patent: Jul. 26, 1994

[54] EXTRUSION APPARATUS WITH A BACKFEED EXTRUDER FOR MIXING AND EXTRUDING OF THERMO-PLASTIC AND THERMO-SETTING MATERIALS

[76] Inventor: Paul Geyer, 210 B. North Lindell Rd., Greensboro, N.C. 27403

[21] Appl. No.: 909,235

[22] Filed: Jul. 6, 1992

[51] Int. Cl.[5] .............................. B01F 7/08; B29B 7/46
[52] U.S. Cl. ......................................... 366/82; 366/86; 366/89; 366/90; 366/298; 425/205
[58] Field of Search ..................... 366/79–84, 366/86, 89–91, 297–300, 318–319, 322–324; 425/204, 205, 208, 209

[56] References Cited

U.S. PATENT DOCUMENTS

| 2,744,287 | 5/1956 | Parshall et al. | |
|---|---|---|---|
| 3,632,255 | 1/1972 | Geyer | |
| 4,075,712 | 2/1978 | Geyer | |
| 4,408,887 | 10/1983 | Yamaoka | 366/82 X |
| 5,129,729 | 7/1992 | Geyer | 366/89 X |
| 5,217,303 | 6/1993 | Geyer | 366/89 X |

FOREIGN PATENT DOCUMENTS

| 2226269 | 11/1974 | France | 425/205 |
|---|---|---|---|
| 59-169826 | 9/1984 | Japan | 425/209 |
| 916255 | 1/1963 | United Kingdom | 366/81 |

Primary Examiner—Timothy F. Simone
Assistant Examiner—Charles Cooley
Attorney, Agent, or Firm—Dykema Gossett

[57] ABSTRACT

An extrusion apparatus having a rotor member rotatable within a barrel member longitudinal and cross-sectionally mixes and extrudes thermo-plastic and thermo-setting materials. The apparatus is articulated into sections including a barrel entrance and forcing section, a blending section, and an end discharge section. The barrel entrance and forcing section consists of helical extrusion grooves which terminate at an abrupt rotor to barrel and barrel to rotor material transfers. The blending section recognizes that blending is volumetric i.e. three-dimensional and therefore longitudinal displacement of the material in relation to itself is one of the dimensions. Longitudinal displacement is accomplished in the blending section by providing a double extrusion capacity main extrusion rotor and a single capacity backfeed rotor arranged to recirculate half of the material processed by the main stream rotor. The blending section is followed by the end extrusion section, which at its lead end is provided with rotor to barrel and barrel to rotor material transfers to cross shear the material in two different directions to complete volumetric blending. The material transfers are followed by helical rotor extrusion grooves as required to build extrusion pressure.

4 Claims, 2 Drawing Sheets

EXTRUSION APPARATUS WITH A BACKFEED EXTRUDER FOR MIXING AND EXTRUDING OF THERMO-PLASTIC AND THERMO-SETTING MATERIALS

BACKGROUND OF THE INVENTION

1. Field of the Invention

This invention relates to an imposed order of cross-sectional and longitudinal displacement of thermo-plastic and thermo-setting materials to warm, blend and extrude the materials. More particularly, this invention concerns a screw or worm type apparatus for the warming, blending and extruding of natural and synthetic elastomeric materials. Unless otherwise indicated the terms "extruder", "extrusion apparatus" used herein refer to and include a screw or worm type apparatus used to obtain an extrudate of the desired cross-sectional configuration, and to subject the process material to an imposed order of shearing which displaces the process material in both the cross-sectional and longitudinal directions.

2. Description of Prior Art

The now conventional extruders, include a barrel, a screw type rotor within the barrel which is adapted for rotational movement relative to the barrel and a means of introducing the material to be processed into the extruder, such as a hopper and its associated apparatus, if any. The rotor is provided with various threaded configurations and rotational movement forces the material through the barrel and out of the downstream end of the extruder. Interposed between the hopper and discharge end are multiple rotor to barrel to rotor process material transfers which cross-blends the process material as it passes member to member. Longitudinal blending is very minor even to being non-existent. Thus, while process material is being discharged from the extruder, hot or cold unprocessed material is fed into the feed hopper at the opposite end of the extruder to provide a continuous process.

Examples of the prior art are U.S. Pat. No. 2,744,287 dated May 8, 1956; U.S. Pat. No. 3,632,255 dated Jan. 1, 1972; and U.S. Pat. No. 4,075,712 dated Feb. 27, 1978.

Although many problems relating to the extrusion of polymers have been solved the flow of material through the typical extruder is similar to the flow of a liquid through a pipe; first in first out. Longitudinal quality is therefor dependent on the quality of the entering material and is a parameter which this invention is designed to improve.

SUMMARY OF THE INVENTION

. The novel extruder of the present invention solves certain problems of the extrusion art by providing an imposed order of extrusion flow to achieve; (a) the proper amount of longitudinal and cross-sectional blending; (b) improved product quality; and (c) economy of operation. The extruder or apparatus is articulated into sections including the forcing section, main longitudinal displacement sections; backfeed longitudinal displacement sections; and the end discharge sections.

The forcing section warms and develops pressure in the process material and can be one of many conventional designs, but always terminates in a rotor to barrel process material transfer. The rotor of the transfer is provided with multiple short extrusion grooves arranged to form the process material into multiple strips and force the strips outward, through the shear area generated between rotor and barrel, to the co-acting barrel, and to thereby achieve cross-sectional blending.

The co-acting barrel is provided with multiple short extrusion grooves which receive the now cross-sheared process material, turn it at right angles and force it longitudinally downstream through the shear area generated between the barrel and the upstream face of the co-acting rotor of the main longitudinal displacement extruder, and to thereby achieve cross-sectional blending at an angle to the established process material flow lines.

The rotor of the main longitudinal displacement extruder at its leading end is provided with multiple short extrusion grooves which at their upstream end receive the longitudinal flow from the co-acting barrel grooves; and which from the radial direction receives the material from the discharge end of the longitudinal backfeed extruder. The two streams of process material are thereby layered in the multiple short extrusion grooves to form a macro-mix and are transported to the following helical extrusion grooves of the main longitudinal displacement rotor.

The helical extrusion grooves of the main longitudinal displacement rotor are provided with double extrusion capacity to accommodate both process material flows while generating extrusion pressure and transporting the process material to multiple short extrusion grooves at the end of the longitudinal displacement section.

These multiple short extrusion grooves are arranged to receive the material and divide it, first radially outward to the lead end of the backfeed longitudinal extruder rotor and second longitudinally through the shear area generated between the rotor and the co-acting barrel of the end discharge extruder.

The backfeed longitudinal extruder transports approximately half of the process material back to the lead end of the main longitudinal rotor to thereby obtain longitudinal displacement of the material in relation to itself and achieve longitudinal blending.

The co-acting barrel of the end discharge extruder provided with multiple extrusion grooves which receive the process material longitudinally from the shear area and redirect it radially inward, through the shear area generated between it and the co-acting rotor of the end discharge extruder. Thus all of the process material to be extruded receives two member to member transfers and the resulting cross-shearing.

The end discharge extruder can be made adjustably restrictive to control the extrusion rate and thereby the extrusion temperature. The cost of process material extruded in a week period of time can equal the cost of the extruder, so product quality, due to extruder design is important.

The long extruders, now being favored by the rubber industry, are actually two extruders in series separated by dwell time to equalize temperature differences. Dwell time therefore is an admission of unequal processing. The "pin type" extruder is actually three times as long as an "adiabatic extruder". Extruder cooling, due to the poor transmission of heat through rubber, is expensive and ineffective. Two test runs with cooling water temperatures of 32° F. and 212° F. differed only 10° F. in extrusion temperature. The novel extruder therefore selects a length of extruder in which the work input is equal to the work required to raise the extrusion to the temperature specified. Thereby the process material is the only coolant and as a result extrusion temperature is the same at all rates of extrusion.

The imposed and repeatable order of mixing can control extrusion temperature, cross-sectional and longitudinal blending at ideal levels. Other mixing parameters include carbon black dispersion, minimizing viscosity degradation, etc. can be developed when these parameters are controlled to a narrow range.

The short length adiabatic extruder can be manufactured at a lower cost than the conventional extruder. The rotor design permits the rotor to be fabricated in sections on ordinary milling machines. The total weight can be as little as one half that of the long extruders.

The sometimes elaborate cooling systems installed on most extruders can be eliminated after establishing start up temperature.

The extruder drive size, motor and gearbox, is proportional to the length of the extruder and is a large part of the extruder cost. Shortening the length can effect considerable savings. As the adiabatic extruder drive is related to the work required to raise the process material temperature, over design is less likely.

The adiabatic design does not limit top speed due to temperature rise and therefore higher rotor speeds are possible to the extent that a smaller size extruder can be used.

It is therefore a feature of the present invention to provide an extruder which can displace the process material longitudinally in relation to itself to make longitudinal blending possible.

Another feature of the present invention is to provide an extruder which cross-shears the process material at four member to member process material transfers.

Still another feature of the present invention is to provide an extruder which at the member to member transfers divides the process material into multiple strips.

A further feature of the present invention is to provide an extruder which displaces the process material longitudinally upstream in quantities equal to the extruder's capacity.

A still further feature of the present invention is to provide an extruder which has main rotor to backfeed rotor transfers which consist of multiple extrusion grooves.

Another feature of the present invention is to provide an extruder which has the backfeed rotor to the main rotor transfer which consists of multiple extrusion grooves.

Still another feature of the present invention is to provide an extruder which has the main rotor to the backfeed rotor transfer provided with a flow limiting device.

A further feature of the present invention is to provide an extruder in which the backfeed rotor to the main rotor transfer is provided with a flow limiting device.

A further feature of the present invention is to provide an extruder in which the input power is approximately equal to the work required to warm the process material.

A still further feature of the present invention is to provide an extruder in which extrusion pressure buildup is progressive along the length of tile extruder.

Another feature of the present invention is to provide an extruder with an imposed order of extrusion in which the process material is processed exactly the same at all times so the extruder action can be depended upon as part of the mixing cycle.

The final feature of the present invention is to provide an extruder which will continuously produce the best quality extrusion at a reduced cost of processing.

DESCRIPTION OF THE PREFERRED EMBODIMENT

Figure 1:
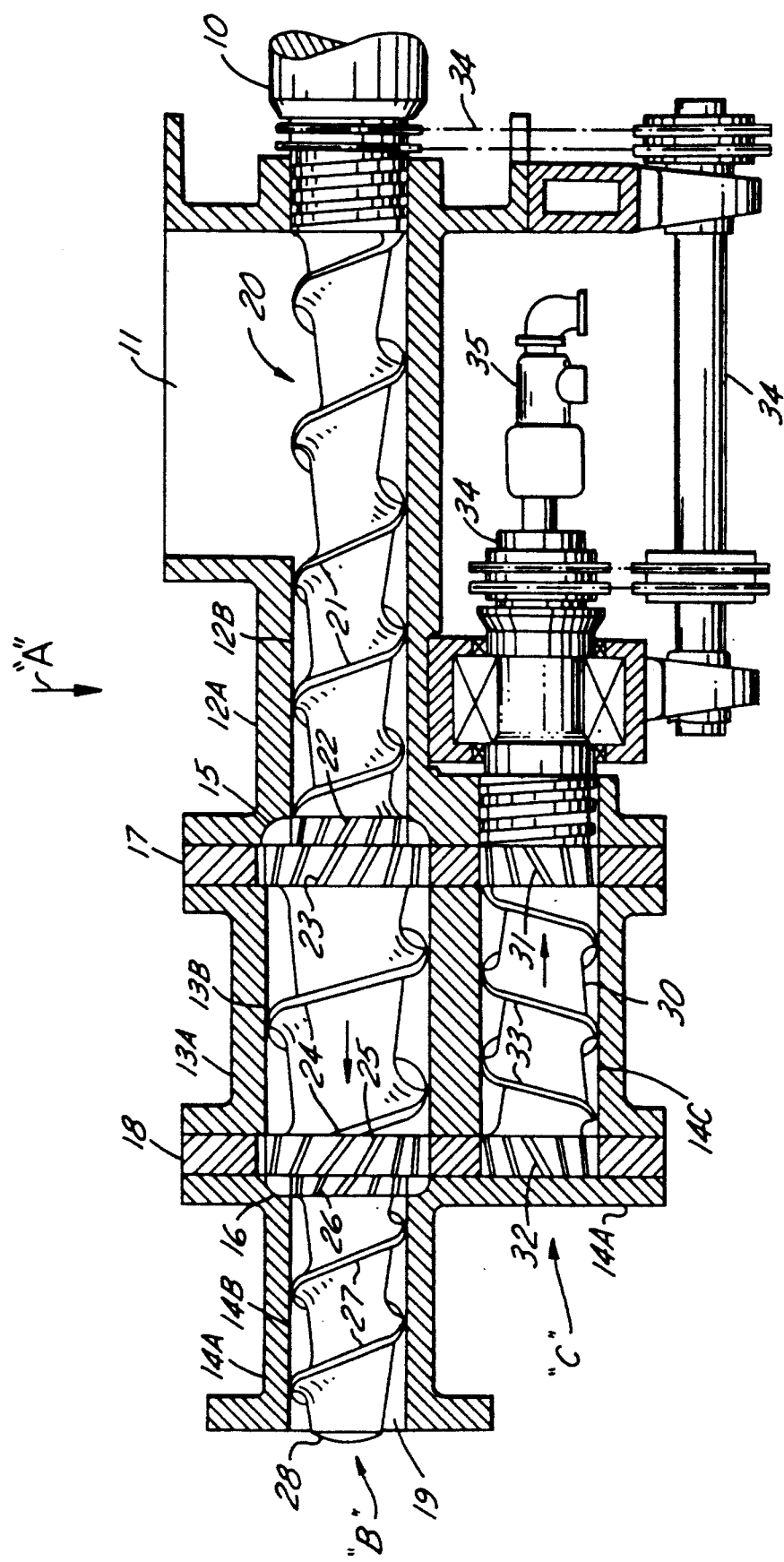
FIG. 1 is a longitudinal view of the extruder or extrusion apparatus, partly in section.

Referring to now the drawings the extrusion apparatus "A" of FIG. 1 is the preferred embodiment of the invention as applied to the processing of material and synthetic rubber materials. The extrusion apparatus A includes a main longitudinal displacement or supply extruder "B" and a backfeed extruder "C". The supply extruder B has a barrel formed by barrel members 12A, 13A, and 14A extending therethrough which acts in combination with a rotor, screw or screw member 20, which is rotatably mounted in the barrel. The rotor member 20 is adapted for rotation by a main extruder drive 10 as is conventional in the art.

The barrel member 12A has a smooth bore 12B and barrel member 14A has a smooth bore 14B of the same diameter as bore 12B. Bore 13B of barrel member 13A is larger in diameter than bores 12B and 14B for an enlarged section of the rotor 20.

The barrel member 12A is provided at a feed end with a hopper opening 11, in a top thereof or in the side thereof. The hopper opening 11 is remote from the discharge end 19 of the barrel member 14A, through which the material to be processed is introduced into the main extruder B.

The rotor member 20 is provided with a single start helical rotor groove 21 at the feed end, which when filled with material introduced through hopper opening 11 and rotated relative to the barrel by drive means 10, causes the material to be processed and to be moved forward along rotor groove 21 to multiple rotor grooves 22 which are located at the downstream end of barrel member 12A.

The multiple rotor grooves 22 are arranged to receive the material from the single start helical rotor groove 21, divide it into multiple strips, direct the multiple strips radially outward, through a first shear area generated between rotor and barrel, and to the multiple barrel grooves 15 formed in barrel member 12A at the downstream end thereof.

The multiple barrel grooves 15 receive the material from the first shear area, divide it into multiple strips, turn it at right angles and direct it longitudinally downstream, through a second shear area generated between the multiple barrel groves 15 and multiple rotor grooves 23 mounted in the co-acting barrel part 17. Barrel part 17 is interposed between and abuts the opposing end faces of barrel members 12A and 13A.

The multiple rotor grooves 23 receive the material from the second shear area, divide it into multiple strips and transport it downstream to a single start helical rotor groove 24. Multiple rotor grooves 23 are larger than the adjacent multiple rotor grooves 22.

The helical rotor groove 24 receives the material from the multiple rotor grooves 23 and transports it downstream to multiple rotor grooves 25 mounted in the co-acting barrel part 18 as viewed in FIG. 1. The multiple rotor grooves 25 receive the material from the helical rotor groove 24 and divide it into two streams in barrel part 18. Barrel part 18 is interposed between and abuts the opposing end faces of barrel members 13A and 14A.

The first stream of the material from helical rotor groove 24 is directed longitudinally downstream through a third shear area generated between rotor and barrel to multiple barrel grooves 16 formed in barrel member 14A. The multiple barrel grooves 16 receive tile material from the third shear area, divide it into multiple strips, turn it at right angles and direct it radially inward through a fourth shear area, barrel to rotor, to the multiple rotor grooves 26 of rotor 20.

The multiple rotor grooves 26 receive the material from the fourth shear area, divide it into multiple strips and transport it downstream to the single start helical rotor groove 27. The helical groove 27 receives the material from multiple grooves 26 and transport it downstream the discharge end of the rotor 28.

The second stream of the material from helical rotor groove 24 is directed radially outward from multiple rotor grooves 25 located in the enlarged section of the barrel to co-acting barrel part 18. The co-acting barrel part 18 is arranged to direct the material to the multiple grooves 32 of backfeed rotor 30 of extruder C. The backfeed rotor 30 is mounted for rotation in a barrel bore 14C.

The multiple rotor grooves 32 receive the material from the co-acting barrel part 18, divide it into multiple strips and transport it back upstream to the single start helical rotor groove 33 of the backfeed rotor 30. The helical rotor groove 33 receives the material from multiple rotor grooves 32 and transport the material upstream to multiple rotor grooves 31.

The multiple rotor grooves 31 receive the material from helical groove 33 divide it into multiple strips, and direct it radially outward to barrel part 17.

Barrel part 17 receives the material radially outward from multiple rotor grooves 31 and directs and returns the material to the multiple rotor grooves 23 of the main rotor 20.

The multiple rotor grooves 23 receive the material in the radial direction and combine it with the main stream material entering multiple rotor groves 23 longitudinally from multiple barrel grooves 15.

The rotor 30 of the backfeed extruder C is adapted for rotation by drive means 34, which is driven by means of chains and sprockets, from the main extruder drive 10. Suitable controls 35 are provided as shown in FIG. 1. The drive means 34 may be optionally equipped with means for providing an adjustable speed ratio which allows selective variation of the speed of the backfeed extruder for a given supply extruder speed.

Figure 2:
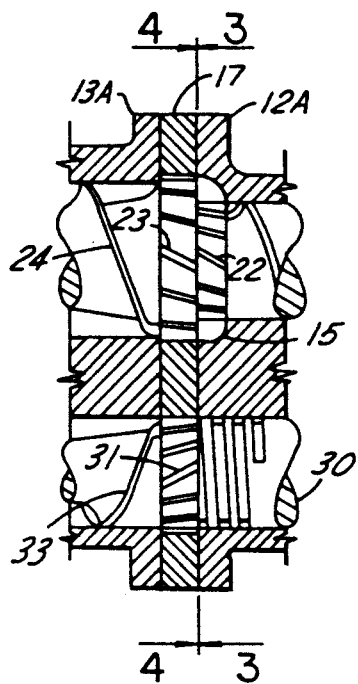
FIG. 2 is a fragmentary cross-sectional elevational view of the material transfer, backfeed extruder to the main extruder.

FIG. 2 illustrates the transfer of material from the backfeed extruder C to the main stream extruder B. The multiple extrusion grooves 31 of the backfeed extruder C, co-acting with barrel part 17 directs the material to flow radially upward and channel it to multiple rotor extrusion grooves 23 of the main extruder B to thereby merge the backfeed material with the main line material.

Figure 3:
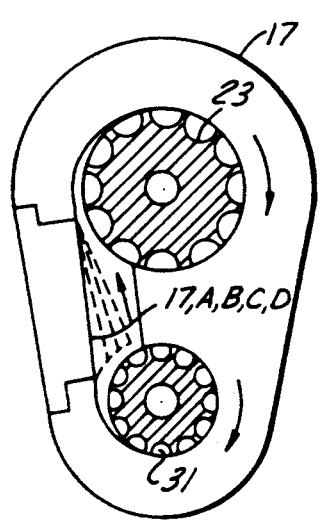
FIG. 3 is a downstream elevational view taken on the line 3—3 of FIG. 2.

FIG. 3 shows the multiple extrusion rotor grooves 31 of the backfeed rotor 30 co-acting with barrel part 17 to channel the backfeed material radially upward to multiple rotor grooves 23 of the main stream extruder B. The barrel part 17 may have one or more optional capacity channels 17 A, B, C or D to control extrusion capacity.

Figure 4:
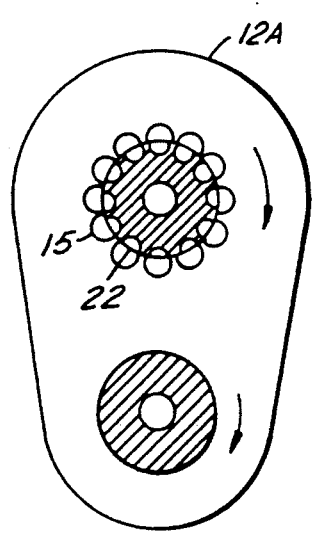
FIG. 4 is an upstream elevational view taken on the line 4—4 of FIG. 2.

FIG. 4 illustrates the barrel member 12A and the transfer of material from rotor multiple grooves 22, through the first shear area generated between members, to the multiple barrel extrusion grooves 15.

Figure 5:
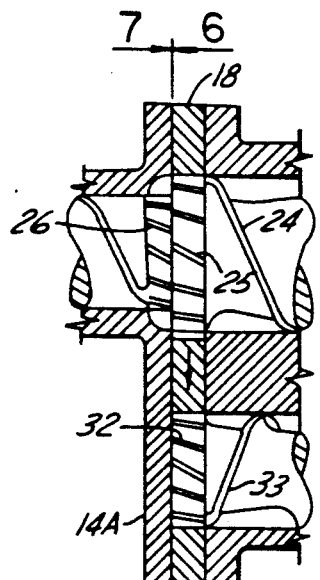
FIG. 5 is a fragmentary cross-sectional elevational view of the material transfer, main extruder to the backfeed extruder.

FIG. 5 illustrates the transfer of a portion of the extrusion material from the main stream extruder B to the backfeed extruder C. A portion of the main stream material entering multiple rotor grooves 25 co-acting with barrel part 18 is directed radially outward into barrel part 18 which channels it downward to multiple extrusion grooves 32 of the backfeed extruder rotor 30 of the backfeed extruder C. The remaining portion of the main stream material entering multiple rotor groves 25 is directed longitudinally downstream, through the third shear area, generated between rotor and barrel, to multiple rotor grooves 26 of the discharge section 14 of the main extruder B.

Figure 6:
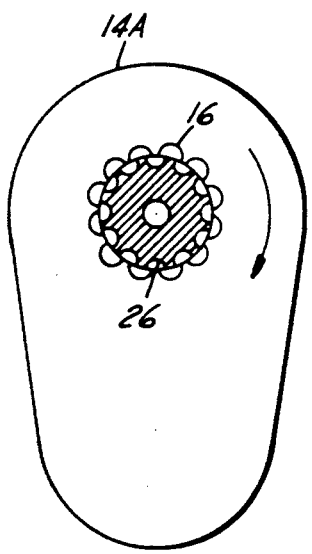
FIG. 6 is a downstream view taken on the line 6—6 of FIG. 5.

FIG. 6 shows the barrel member 14A and the multiple barrel grooves 16 which direct the material received, downward through the fourth shear area generated between barrel and rotor to multiple rotor grooves 26.

Figure 7:
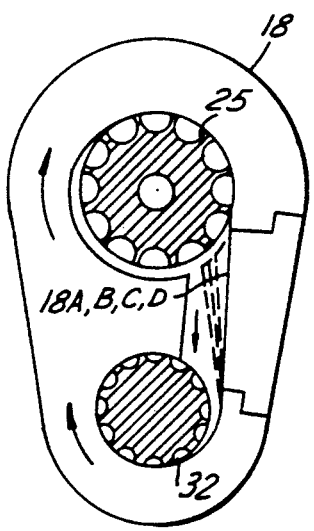
FIG. 7 is an upstream view taken on the line 7—7 of FIG. 5.

FIG. 7 illustrates the barrel part 18 and the multiple rotor grooves 25 of the main stream extruder B which direct the remaining portion of the extrusion material radially downward to multiple extrusion grooves 32 of the backfeed extruder C. The barrel part 18 has one or more connecting channel 18 A, B, C, or D which are adjustable in capacity by changing inserts.

I claim:

1. An apparatus for the extrusion of natural and synthetic rubber stocks, which comprises:

a barrel defining a longitudinal supply bore and a parallel longitudinal backfeed bore;

a supply rotor rotatably disposed within the supply bore;

a backfeed rotor rotatably disposed within the backfeed bore;

the supply bore and the supply rotor cooperatively defining a supply extruder designed to masticate, warm, pressurize and to otherwise work the stock introduced therein, the supply extruder having a feed section with feed section helical grooves in the supply rotor operably advancing a first stream of stock toward an enlarged rotor section of the supply rotor with enlarged rotor section helical grooves providing a double extrusion capacity;

the backfeed bore and the backfeed rotor cooperatively defining a backfeed extruder having a first end and an oppositely disposed second end and having helical grooves therebetween in the backfeed rotor operably advancing a second stream of stock toward the first end for entry into the enlarged rotor section; and means for communicating the first stream of stock from the feed section to the enlarged rotor section and for communicating the second stream of stock from the first end of the backfeed extruder to the enlarged rotor section, including multiple rotor grooves in the feed section of the rotor at an end of the feed section being longitudinally open toward the helical grooves of the feed section of the rotor and operably receiving stock therefrom, multiple barrel grooves in a feed section of the barrel being radially open toward the feed section rotor grooves and defining a first shear area therebetween and operably receiving stock therethrough and being longitudinally open toward the enlarged rotor section to direct stock thereto, multiple rotor grooves in an enlarged rotor section of the supply rotor corresponding to the enlarged rotor section and at a first end of the enlarged rotor section longitudinally open toward the feed section multiple barrel grooves and defining a second shear area therebetween and operably receiving stock therethrough and the multiple rotor grooves in the enlarged rotor section being radially open to a first connecting cavity and receiving stock therein and the multiple rotor grooves in the enlarged rotor section being longitudinally open toward the helical grooves of the enlarged rotor section of the rotor and directing stock thereto, and multiple rotor grooves in the backfeed rotor at a first end of the backfeed rotor longitudinally open toward helical grooves of the backfeed rotor and for operable receiving stock therefrom and being radially open to the first connecting cavity and directing stock thereto.

2. Apparatus for the extrusion of natural and synthetic rubber stocks as claimed in claim 1, further comprising:

a discharge section of the supply extruder extending from the enlarged rotor section opposite the feed section and defined by a discharge section of the supply rotor with helical grooves operably transporting stock away from the enlarged rotor section to an output end of the extruder and a discharge section of the supply bore.

3. Apparatus for the extrusion of natural and synthetic rubber stocks as claimed in claim 2, further comprising:

means for dividing stock from the enlarged rotor section into the second stream of stock and a third stream of stock with the second stream of stock being directed to a second end of the backfeed rotor and with the third stream of stock being directed to the discharge section of the supply extruder, including multiple rotor grooves in a second end of the enlarged rotor section longitudinally open toward both the helical grooves of the enlarged rotor section and operably receiving stock therefrom and radially open to a second connecting cavity and directing stock thereto, multiple rotor grooves in the backfeed rotor at the second end of the backfeed rotor radially open toward the second connecting cavity and operably receiving stock therefrom and being longitudinally open toward helical grooves of the backfeed rotor and operably directing stock thereto, multiple barrel grooves in the discharge section of the barrel being longitudinally open toward the rotor grooves in the second end of the enlarged rotor section and defining a third shear area therebetween and operably receiving stock therethrough and being radially open toward the discharge section of the supply rotor to direct stock thereto, and multiple rotor grooves in the discharge section of the supply rotor at a first end of the discharge section being radially open toward the multiple barrel grooves in the discharge of the barrel and defining a fourth shear area therebetween and operably receiving stock therethrough and directing stock toward the helical grooves of the discharge section of the supply rotor.

4. An apparatus for the extrusion of natural and synthetic rubber stocks as claimed in claim 1, wherein the backfeed extruder is provided with a drive with an adjustable speed ratio to a drive provided for the supply extruder.

* * * * *